United States Patent

Kehl et al.

Patent Number: 6,045,763
Date of Patent: *Apr. 4, 2000

[54] PROCESS FOR WORKING UP AMMONIACAL METAL SOLUTIONS INCLUDING TREATING THE WASH WATER WITH AN ORGANIC EXTRACTION SOLUTION

[75] Inventors: Ralf Kehl, Duesseldorf; Werner Schwab, Monheim, both of Germany

[73] Assignee: Henkel Kommanditgesellschaft auf Aktien, Duesseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/983,064
[22] PCT Filed: Jun. 3, 1996
[86] PCT No.: PCT/EP96/02385
§ 371 Date: Dec. 12, 1997
§ 102(e) Date: Dec. 12, 1997
[87] PCT Pub. No.: WO96/41902
PCT Pub. Date: Dec. 27, 1996

[30] Foreign Application Priority Data

Jun. 12, 1995 [DE] Germany .......................... 195 21 352

[51] Int. Cl.⁷ .......................... B01D 11/00; C22B 15/00; C23F 1/00
[52] U.S. Cl. .......................... 423/24; 423/99; 423/139; 423/DIG. 14; 216/93
[58] Field of Search .......................... 423/24, 99, 139, 423/DIG. 14; 216/105, 93

[56] References Cited

U.S. PATENT DOCUMENTS

| | | | |
|---|---|---|---|
| 3,743,585 | 7/1973 | Lowenhaupt et al. | 204/112 |
| 3,981,968 | 9/1976 | Miller et al. | 423/139 |
| 4,012,482 | 3/1977 | Natwig et al. | 423/24 |
| 4,083,758 | 4/1978 | Hamby et al. | 204/106 |
| 4,222,832 | 9/1980 | Hubred et al. | 204/106 |
| 4,252,621 | 2/1981 | Reinhardt et al. | 423/24 |
| 4,507,268 | 3/1985 | Kordosky et al. | 423/24 |
| 5,788,844 | 8/1998 | Olafson | 423/24 |

FOREIGN PATENT DOCUMENTS

| | | |
|---|---|---|
| 0 005 415 | 11/1979 | European Pat. Off. . |
| 0 036 401 | 9/1981 | European Pat. Off. . |
| 43 34 696 | 4/1995 | Germany . |

OTHER PUBLICATIONS

Industrial & Engineering Chemistry Research, 28(11): 1664–69 (Nov. 1, 1989).

Primary Examiner—Steven Bos
Attorney, Agent, or Firm—John E. Drach; Henry E. Millson, Jr.

[57] ABSTRACT

The invention relates to a process for working up charged aqueous solutions, more especially etching solutions, which contain ammonia, at least one ammonium salt and metal ions in dissolved form and which accumulate in the treatment of substrates containing valuable metals, more especially copper-containing electronic sub-assemblies by contacting the aqueous solution with an organic water-immiscible extractant in one or more extraction stages to form an organic phase containing valuable metals and an aqueous phase, (b) washing the organic phase with a water-containing liquid in one or more successive washing stages wherein the water-containing liquid has a pH above 6.5 in the first washing stage and after said washing stage contacting the washing water before reuse with an organic extraction solution, and (c) conducting one or more stripping stages to transfer the valuable metals from the organic phase to an aqueous phase.

12 Claims, 1 Drawing Sheet

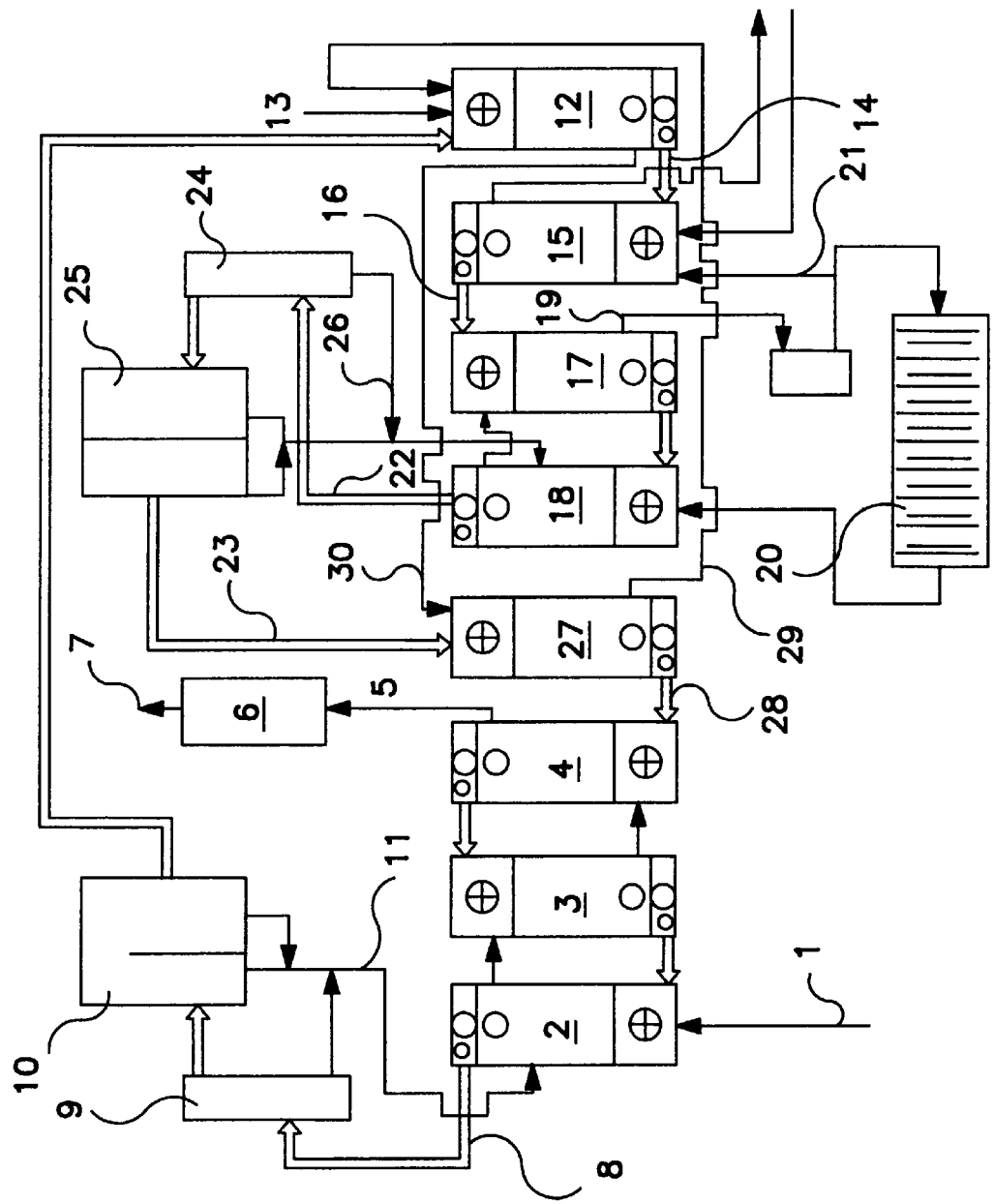

PROCESS FOR WORKING UP AMMONIACAL METAL SOLUTIONS INCLUDING TREATING THE WASH WATER WITH AN ORGANIC EXTRACTION SOLUTION

BACKGROUND OF THE INVENTION

1. Field of the Invention

This invention relates to a process for working up ammoniacal solutions containing valuable metals, more especially copper-containing solutions, which reduces the consumption of ammonia and the unwanted discharge of salts in solvent extraction in relation to the prior art.

2. Discussion of Related Art

In the production of printed circuit boards for the electronics industry, the ammonium chloride solution used as the etching solution becomes enriched with copper during the continuous etching process. During this process, the copper content in such solutions increases continuously until, finally, a critical limit for the etching process is reached at a content of around 130 to 150 g of copper per liter. To enable processing of the circuit boards to be continued without interruption, excess copper has to be removed from the etching solution.

This can be done by various methods. For example, corresponding solutions are collected and concentrated by evaporation and, finally, the copper is recovered in the form of a salt, generally as copper hydroxide, by the addition of suitable precipitation reagents. Techniques such as these are expensive on energy and show poor selectivity and the copper obtained as end product is of inferior quality. Another disadvantage of this method is that there is no possibility of fully regenerating the spent etching solution and hence reusing it in the etching process.

EP-A-005415 discloses a process for removing copper from an etching solution used in solvent extraction. This process uses a weak extractant dissolved in an organic solvent which reduces the copper content in the etching solution after extraction from 160 g/l to around 97 g/l. β-Diketones are preferably used as extractants in this process. The organic extraction solution is washed with water which gradually becomes enriched with large quantities of ammonium salts, ammonia and copper. Sodium hydroxide is added to the washing water which is then concentrated by evaporation, the ammonia being driven out and the copper being removed as copper hydroxide. The copper present in the organic phase is stripped with strong sulfuric acid and recovered from the aqueous solution by electrolysis. The process is operated on site, i.e. follows the etching process.

EP-A-036401 discloses a similar process. In this process, however, extraction is carried out in one or more steps with various extractants or mixtures thereof. For example, in addition to the β-diketones known from EP-A-005415, hydroxy oximes are used as stronger extractants in this process. The copper content in the etching solution can thus be reduced to a total of 6.5 g/l. The process is extremely complicated on account of the need to use two separate extraction circuits and different reagents or mixtures thereof and/or to operate several different successive extraction stages and, for this reason, has never been adopted for practical application. In this process, too, the charged extraction solution is washed with mineral acid in order to free the organic phase from entrained ammonia.

Although the solvent extraction processes mentioned are more efficient by comparison with working up using precipitation reagents, they are still attended by certain serious disadvantages. For example, although the copper content in the extracted etching solution can be reduced to levels which, in principle, enable the etching process to be continued, the copper content is still very high at around 90 g/l or 6.5 g/l. This applies in particular to regeneration and reuse of the etching solution. The copper content cannot be reduced to values in the ppm range by these processes. Accordingly, the spent etching solution also cannot be completely worked up and reused which would be desirable in view of the total quantity of etching solution.

Although, with the introduction of new and more efficient extractants, such as for example LIX® 84, a ketoxime available from Henkel Corp., very low copper concentrations in the required ppm range can be reached in the purified etching solution without the use of extractant mixtures or separate, different extraction circuits, the complexing agents used have a tendency to complex free ammonia in a secondary reaction and to entrain it into the organic phase. However, in order to minimize the copper content of the extracted etching solution, the extractant has to be used in excess.

Now, a serious disadvantage of using such relatively strong extractants is that, in addition to the actual extraction of the copper into the organic phase, a troublesome unwanted effect is observed in the form of the extraction of free ammonia, which is always present in the spent etching solution, and the carryover of aqueous ammoniacal phase.

DE-A1-43 34 696 describes one such extraction process using a hydroxyoxime as a strong extractant. In this case, too, washing with acidified water is carried out to purify the organic phase, evaporation and subsequent recycling of the ammonium salt to the etching solution being mentioned as a working-up step for desalting the washing water after the extraction of ammonia. In addition to the considerable consumption of energy for evaporating the water, it is still necessary in the above-mentioned process to maintain a stream of solids which is more expensive than maintaining pure liquid streams.

This corresponds to the conventional practice of washing the organic extractant with aqueous dilute mineral acid, preferably HCl, until the ammonia has passed completely into the aqueous phase as ammonium salt for the purpose of removing ammoniacal impurities.

All the processes mentioned above are attended by the disadvantage that ammonium salts are constantly formed in aqueous solution and the concentration of ammonia in the etching solution decreases through the acidic washing of the organic solution to remove the ammonia. Either the ammonium salt has to be recovered from the aqueous phase so that it may be reused, which entails an additional separating step, or ammonia has to be continuously added to the etching solution which, as an additional cost factor, makes the process more uneconomical.

Although washing with hydrochloric acid leads to ammonium chloride, which may be returned to the etching process after further separation steps, this process is attended by the danger that chloride ions can be carried over into the stripping process and, hence, also into the electrolysis process for separating the valuable metal. This can give rise, for example, to serious disturbances in the metal extraction electrolysis process which are reflected in poorer quality of the valuable metal separated or which produce operational problems. Accordingly, efforts were made to carry out the first washing stage with sulfuric acid in order to minimize the danger of contamination by chloride ions. However, the disadvantage of this approach is that the ammonium sulfate formed cannot be fed back into the circuit and, hence, represents an additional cost factor both through the continuous consumption of ammonia and/or ammonium chloride and through the disposal costs for the ammonium sulfate.

Now, the problem addressed by the present invention was to provide a process for working up etching solutions containing valuable metals by which both the physically entrained ammonia and also the ammonia entrained in complexed form could be removed from the organic extraction solution and readily introduced into the circuit of the etching solution. Another problem addressed by the present invention was to minimize the discharge of salts in the form of ammonium salts. A further problem addressed by the invention was to select the process in such a way that it could be incorporated in already known metal extraction processes and would lead to substantially complete recycling of the etching solution as a whole.

DESCRIPTION OF THE INVENTION

The present invention relates to a process for working up aqueous solutions, more especially etching solutions, which contain ammonia, at least one ammonium salt and metal ions in dissolved form and which accumulate in the treatment of substrates containing valuable metals, more especially copper-containing electronic sub-assemblies, the working up process comprising at least a) one or more extraction stages in which the solution containing valuable metals is contacted with an organic water-immiscible extractant, b) one or more successive washing stages in which the organic extractant containing valuable metals separated off is washed with water-containing liquids and c) one or more stripping stages in which the valuable metal is transferred from the organic phase to an aqueous phase, characterized in that water with a pH value above 6.5 is used in the first washing stage and, after the washing stage, the washing water is contacted before reuse with an organic extraction solution.

Valuable metals in the context of the invention are any metals which can be transferred from a substrate in ionic form to the aqueous phase through an aqueous solution containing an ammonium salt, ammonia and optionally other additives. It is immaterial whether the valuable metal occurs in the substrate in the elemental neutral form or in ionic form, for example as an oxide, sulfide, selenide, telluride, sulfite, carbonate, nitrate, nitrite, silicate, halide or cyanide. Compounds in the form of mixed salts with various valuable metals and compounds containing, for example, water of crystallization or similar non-metallically, ionically or covalently bonded elements or molecules may also be worked up in the form according to the invention. Valuable metals in the context of the present invention are in particular any transition metals which are known to the expert from the periodic system of elements. These transition metals include, in particular, nickel, copper and zinc. According to the invention, copper is the preferred valuable metal.

Substrates in the context of the present invention are both the carriers of the valuable metals emanating from natural sources, such as for example the oxidic, sulfidic and mixed ores obtained in mining or open-cast workings and the products of the synthetic dressing of the ores following their extraction by mining. The treatment according to the invention may be applied both to the principal products from primary extraction, for example from the separation of various valuable metals, and to the secondary products from the synthetic working up for recovering valuable metals present in low concentrations in waste materials. In addition to the treatment of valuable metals during their extraction from natural substrates or from products and/or secondary products of the following synthetic steps, the process according to the invention may also be used in the treatment of those sources of valuable metals which represent a combination of valuable metal and synthetic substrate. Such substrates are, for example, the printed circuits used in the electronics industry. In the production of such printed circuits, elemental copper is dissolved in large quantities from a board consisting of synthetic polymers using an ammoniacal solution of ammonium chloride in water as the etching solution and is transferred in ionic form to the aqueous solution.

The working up of such aqueous valuable metal solutions from the processing of copper-containing electronic sub-assemblies in accordance with the invention represents the preferred embodiment of the present invention.

The ratio by weight of valuable metal to substrate and the percentage by weight of the valuable metal in its compound are of no relevance to the working up process according to the invention.

BRIEF DESCRIPTION OF THE DRAWING

One embodiment of the invention on which the following description is based and which is intended to be purely exemplary with no limiting character is illustrated in the accompanying drawing. In the drawing, the lines which have been filled in relate to the transport of aqueous phases while the lines which have not been filled in relate to the transport of organic phases. The reference numerals used in the drawing have the following meanings:

1: inlet for the spent aqueous etching solution
2,3,4: mixer-settlers for the extraction process
5: outlet for the worked-up etching solution (raffinate phase)
6: active carbon filter
7: regenerated etching solution for reuse
8: outlet for the charged organic phase
9: separator
10: buffer tank
11: return of entrained aqueous phase to the etching solution
12: substantially neutral washing stage
13: inlet for the washing water
14: outlet for charged organic phase after washing
15: acidic washing stage with pH control
16: outlet for charged organic phase after acidic washing
17,18: stripping stages
19: outlet for the stripping solution containing valuable metals
20: electrolysis
21: introduction of the acidic stripping solution for the acidic pH-controlled washing stage (15)
22: outlet for the stripped organic phase
23: inlet for the stripped organic phase into the washing stage
24: separator
25: buffer tank
26: return of the entrained aqueous phase to the stripping circuit
27: washing stage for internal recycling of ammonia
28: return of the stripped organic phase to the extraction circuit
29: return of the washing water from the washing stage for the stripped organic phase to the first washing stage for the charged organic phase (12)
30: inlet for the washing water from the central washing stage into washing stage 27.

DETAILED DESCRIPTION OF THE DRAWING

In the working up of the solutions containing valuable metals, the aqueous solution containing the valuable metals, preferably a charged aqueous etching solution, is first passed through an inlet (1) into one or more mixer-settler systems (2,3,4) arranged in tandem or in parallel, mixed therein with an organic extractant by intensive stirring and then separated in a stabilizing zone into an organic phase and an aqueous phase.

In one mixer-settler system, two immiscible liquids are first contacted by intensive stirring and resulting surface enlargement of the phase boundary in order thereafter to separate back into the individual phases in a stabilizing zone fed by an overflow.

A spent aqueous etching solution is understood by the expert to be an etching solution of which the content of valuable metal ions is so high that the required dissolving of the valuable metal no longer takes place at the required speed and/or with the required selectivity and/or of which the chemical and/or physical characteristics are modified in such a way that the overall process on which dissolution of the valuable metal is based can no longer take place.

The aqueous solution containing valuable metals typically contains valuable metal ions in a concentration of 0.1 to 200 g/l. The particular concentration may depend both upon the individual valuable metal and upon the substrate used. In a preferred embodiment, the solutions worked up have a valuable metal content of 50 to 200 g/l, more particularly in the range from 100 to 200 g/l and more preferably in the range from 120 to 200 g/l.

In addition to the valuable metal ions, the aqueous solution containing valuable metals contains one or more ammonium salts, preferably ammonium chloride, optionally ammonia and, if desired, other additives.

The etching solution worked up may be reused as regenerate for the etching process (7) after passing through an outlet (5) to remove traces of the organic phase in an active carbon filter (6).

Liquid immiscible complexing agents may be used as the extractant, although it is preferred to use solid or liquid complexing agents which are generally dissolved in completely or substantially water-immiscible, inert organic solvents. A particularly preferred embodiment is characterized by the use of an organic extraction solution containing in an organic solvent one or more complexing agents which form with metal ions a complex soluble in the organic extraction solution. Suitable inert organic solvents which are substantially immiscible with or insoluble in water are, for example, the following compounds: aliphatic, cycloaliphatic or aromatic hydrocarbons of high boiling point or mixtures thereof, chlorinated hydrocarbons, ketones or ethers of high boiling point or even mixtures of such compounds. Kerosines or mixtures thereof are preferably used as the substantially water-insoluble or water-immiscible organic solvents.

The quantity ratio of organic phase to aqueous phase can be adjusted by variation of the flow rates of organic phase (O) and aqueous phase (A). According to the invention, the extraction process may be carried out with a ratio of O to A of 20:1 to 1:1, preferably 15:1 to 5:1 and, more preferably, 12:1 to 8:1.

The charged organic phase may optionally be transferred through an inlet (8) to one or more separators (9) and/or buffer tanks (10) arranged in tandem or parallel where it is very largely freed from entrained aqueous phase while the aqueous phase separated off is generally returned to the extraction process (11).

The charged organic phase is the organic liquid which, after the extraction process, has absorbed the largest proportion of the valuable metal ions from the aqueous solution in complexed form.

A feature crucial to the present invention is now a first water-based, substantially neutral washing stage (12) in which the charged organic phase is supplied through an inlet (13) with water generally containing 0.1 to 10% by weight of ammonium chloride and washed in a mixer-settler system.

One preferred embodiment is characterized by the use of water containing 0.5 to 5% by weight and, more preferably, 0.5 to 1.5% by weight of ammonium chloride.

After washing, the phases are normally separated into an aqueous phase and an organic phase. In addition to the ammonium salt initially introduced, the aqueous solution contains free ammonia washed out from the complexed form in the organic phase into the aqueous phase. The organic phase mainly contains the complexed valuable metal together with complexing agent and non-complexed ammonia.

After being transferred (14) to a following stage (15), the organic phase separated off is generally washed with water which contains 0.1 to 10% by weight, preferably 0.5 to 5% by weight and more preferably 0.1 to 1.5% by weight of a salt, preferably sodium sulfate, and to which a mineral acid is added to adjust the pH value. The pH is preferably adjusted to a value of 4.5 to 6.0, more preferably to a value of 4.8 to 5.5 and most preferably to a value of 5.0 to 5.3.

The washed organic extraction solution is then freed from the valuable metal (16), preferably in one or more stripping stages (17,18) arranged in tandem or parallel. Stripping is generally carried out by contacting the organic extraction solution with dilute mineral acid having a pH value below 4, a pH value below 2 being preferred and a pH value below 1 being particularly preferred. The required pH value may immediately be selected by the expert through knowledge of the extractant used and the valuable metal.

Sulfuric acid is preferably used as the mineral acid.

In this washing stage, the complexed valuable metal ions are transferred in the form of their salts to the aqueous phase while the protonated complexing agent remains behind in the organic solvent. After being transferred (19) to an electrolysis stage (20), the acidic aqueous metal salt solution is normally freed from most of the valuable metal and then returned to the stripping circuit.

A small part of the acidic solution containing the valuable metal may be used for pH adjustment in the acidic washing stage (15) by controlled introduction (21).

After transfer (22) to one or more separators (24) or buffer tanks (25) arranged in tandem or parallel, the stripped organic extraction solution is optionally freed largely from entrained aqueous strip phase which may be returned to the stripping circuit (26).

The stripped organic extraction solution (23), in which the complexing agent is present in protonated form, is preferably transferred to one or more other mixer settlers (27) in which it is contacted with the ammonia-containing washing water from the first substantially neutral washing stage (12). Most of the free ammonia from the aqueous phase is transferred by extraction to the stripped organic phase, i.e. the aqueous phase is largely freed from the ammonia by washing with the organic regenerated extractant. The organic extractant thus enriched with ammonia is then preferably reused for extraction of the charged aqueous etching solution (28). The free valuable metal ions from the etching solution (1) largely release the bound ammonia in one or more extraction stages (2,3,4), undergoing complexing themselves in the process, so that the ammonia released is returned to the etching solution and hence to the etching circuit (7).

According to the invention, the washing water substantially freed from the ammonia is reintroduced (29) into the first washing stage (12).

The transfer of the valuable metal ions from the aqueous phase to the organic phase during the extraction steps is supported by a substantially hydrophobic complexing agent which, through specific or non-specific interaction and/or coordination with the valuable metal ion, compensates and/or shields the charge of the valuable metal ion in such a way that the polarity is reduced sufficiently to modify the solubility of the ion in the aqueous phase in favor of improved solubility of the complex in the organic solvent with simultaneous transfer to the organic phase.

Complexing agents capable of developing such interactions with valuable metal ions include certain phosphorus compounds, β-diketones, organic carboxylic acids, aromatic amines, phenols, ketoximes, aldoximes and other chelating agents. Examples of individual classes of compounds are, for example, di-(2-ethylhexyl)-phosphoric acid, acetyl acetone, oxalic acid, citric acid, 2,2'-bipyridyl, o-phenylenediamine, salicylaldehyde, ethylenediamine tetraacetic acid, the assignment of the individual extractants to the metal ions to be preferably complexed therewith being familiar to the expert.

According to the invention, processes in which aldoximes and/or ketoximes are used as complexing agents are particularly preferred. In one particularly preferred embodiment, the organic extractants used contain complexing agents in a quantity of 1 to 99% by weight, preferably in a quantity of 5 to 35% by weight and more preferably in a quantity of 10 to 30% by weight. The concentration of the complexing agents in the solvent has to be gauged in such a way that, both with protonated and with complexed complexing agent, the physical properties of the extraction solution allow handling in accordance with the invention, a concentration of complexing agents in the extractant which leads to a low-viscosity solution liquid at room temperature being preferred.

In one particularly preferred embodiment of the invention, copper is recovered as the valuable metal, the copper preferably being obtained from the treatment of copper-containing electronic sub-assemblies.

EXAMPLES

Examples for Determining the Quantity of Salt Produced per Quantity of Copper Transported by Two Different Methods LIX®84 is an extractant of the ketoxime type.
Method A (Invention):

A spent ammoniacal etching solution containing 129 g/l of copper and around 120 g/l of total ammonia, the largest part of the ammonia being present in the form of the copper/ammonium chloride complex, was continuously extracted in three successive extraction stages (2,3,4) with a 30% by volume solution of LIX®84 in kerosine. The inflow of the aqueous and organic components was regulated in such a way that a constant ratio (O/A) between the organic phase (O) and the aqueous phase (A) was established in the extraction stage. The charged organic phase was substantially freed from entrained aqueous phase in a separator and a buffer tank and was then washed in a first washing stage (12) with a 1% by weight solution of ammonium chloride in water, the inflow of the aqueous component and the organic component being regulated in such a way that a constant ratio (O/A) between the organic phase (O) and the aqueous phase (A) was established in the first washing stage. The organic phase separated off was then rewashed with a solution of 1% by weight of sodium sulfate in water (14), to which small quantities of the copper-containing electrolyte from the following stripping stage (17) were added to adjust the pH to a value of 6.0. The inflow of the aqueous and organic components was regulated in such a way that a constant ratio (O/A) between the organic phase (O) and the aqueous phase (A) was established in the second pH-controlled washing stage (15). In the following stripping stages (17,18), the copper-containing organic phase was in contact with the copper-depleted electrolyte from the extraction electrolysis process (20) and the copper ions were thus stripped. A small part of the sulfuric acid stripping solution thus obtained was used for the above-mentioned pH adjustment in the second washing stage (21). The extraction was preceded by an additional washing stage in which the stripped organic phase, after passing through the separator (24) and the buffer tank (25), was contacted with the ammonia-containing washing water from the first washing stage (12). Most of the free ammonia from the aqueous phase was transferred by extraction to the organic stripped phase, i.e. the aqueous phase was largely freed from the ammonia by washing with the organic extractant. The organic extractant thus enriched with ammonia was then reused for extraction of the charged aqueous etching solution (28). The free copper ions largely released the bound ammonia in the extraction stages (2,3,4), undergoing complexing themselves in the process, so that the ammonia released was returned to the etching solution.

The efficiency of the process was evaluated on the basis of the acid consumption in the pH-controlled washing stage (15) and the quantity of ammonium salt produced in dependence upon the quantity of copper transferred in the organic phase. The results obtained are shown in Table 1 below for different reaction parameters.

TABLE 1

| Test No. | Phase Ratio O/A (2,3,4) | O/A (17) | O/A (12) | O/A (15) | Test Duration (h) | Through-flow in ml (20) | Cu-Transf. [g] | $(NH_4)_2SO_4$ Formed [g]/g Cu Transp. [g] |
|---|---|---|---|---|---|---|---|---|
| 1 | 10.2/1 | 1.15/1 | 3.25/1 | 4.5/1 | 6 | 15.0 | 149.9 | 0.023 |
| 2 | 10.3/1 | 1.15/1 | 3.2/1 | 4.4/1 | 6 | 15.5 | 146.0 | 0.024 |
| 3 | 10.3/1 | 1.15/1 | 3/1 | 4.5/1 | 6 | 18.2 | 158.8 | 0.026 |
| 4 | 10/1 | 1.15/1 | 3/1 | 4.5/1 | 6 | 11.5 | 153.0 | 0.017 |
| 5 | 10/1 | 1.15/1 | 3/1 | 4.4/1 | 6 | 20.5 | 152.8 | 0.031 |
| 6 | 9.7/1 | 1.15/1 | 3/1 | 4.5/1 | 6 | 19.0 | 158.0 | 0.028 |

Method B (Comparison):

An ammoniacal etching solution containing 129 g/l of copper and around 160 g/l of ammonia, most of the ammonia being present in the form of the copper/ammonium chloride complex, was continuously extracted in three successive extraction stages using a 30% solution of LIX®84 in kerosine. The inflow of the aqueous and organic components was regulated in such a way that a constant ratio between the organic phase (O) and the aqueous phase (A) was established in the extraction stage (E).

By comparison with method A, only one pH-controlled washing stage a 1% by weight solution of ammonium sulfate in water was used in method B for the charged organic phase. In addition, extraction was preceded by a separate washing stage using a 1% by weight solution of ammonium chloride in water for the stripped organic phase.

The charged organic phase was largely freed from entrained aqueous phase in a separator and a buffer tank and was then washed in a serial pH-controlled washing stage (W1) with a 1% by weight solution of ammonium sulfate in water to which the acidic copper-depleted electrolyte (P.E.) from the extraction electrolysis process was added to adjust the pH to 6.0. The inflow of aqueous and organic components was regulated in such a way that a constant ratio between the organic phase (O) and the aqueous phase (A) was established in the pH-controlled washing stage (W1). In the following stripping stage (S), the copper-containing organic phase was contacted with the depleted electrolyte from the extraction electrolysis process so that the copper ions were stripped.

The efficiency of the process was evaluated on the basis of the acid consumption in the pH-controlled washing stage and the quantity of ammonium salt produced as a function of the quantity of copper transferred in the organic phase. The results are set out in Table 2 below.

TABLE 2

| Test No. | Phase Ratio O/A (E) | O/A (S) | O/A (W1) | Test Duration (h) | Through-flow in ml (20) | Cu Transf. [g] | $(NH_4)_2SO_4$ Formed [g]/g Cu Transp. [g] |
|---|---|---|---|---|---|---|---|
| 1 | 10/1 | 1.15/1 | 4/1 | 6 | 159.0 | 149.9 | 0.246 |

What is claimed is:

1. A process of regenerating an aqueous solution containing ammonia, at least one ammonium salt and metal ions in dissolved form which accumulate in the treatment of substrates containing valuable metals, comprising (a) contacting said aqueous solution with an organic water-immiscible extractant in one or more extraction stages to form an organic phase containing valuable metals and a regenerated aqueous phase, (b) reusing the regenerated aqueous phase in the treatment of said substrates, (c) washing said organic phase with a water-containing liquid in one or more successive washing stages wherein said water-containing liquid has a pH above 6.5 in the first washing stage, (d) conducting one or more stripping stages to transfer said valuable metals from the organic phase to an aqueous phase, (e) contacting the water-containing liquid from the first washing stage in step(c) with the stripped organic phase to transfer free ammonia in the water-containing liquid to said stripped organic phase, (f) recycling the stripped organic phase to said one or more extraction stages and (g) recycling the water-containing liquid which has had the free ammonia transferred away from it to the first washing stage in step (c).

2. A process as in claim 1 wherein said water-containing liquid in said first washing stage contains from 0.1% to 10% by weight of ammonium chloride.

3. A process as in claim 1 wherein said water-containing liquid in said first washing stage contains from 0.5% to 5% by weight of ammonium chloride.

4. A process as in claim 1 including employing water having a pH of 4.5 to 6 in a second washing stage for said organic phase prior to said stripping stages.

5. A process as in claim 1 wherein said organic water-immiscible extractant comprises an organic solvent containing one or more complexing agents which form a complex with said metal ions that is soluble in said organic extractant.

6. A process as in claim 5 wherein said complexing agents are selected from the group consisting of aldoximes and ketoximes.

7. A process as in claim 1 wherein said organic extractant contains from 1% to 99% by weight of a complexing agent.

8. A process as in claim 1 wherein said valuable metals comprise copper.

9. A process as in claim 1 wherein said aqueous solution is obtained from the treatment of copper-containing electronic sub-assemblies.

10. The process of claim 1 wherein in step (b) the regenerated aqueous phase is treated to remove traces of the organic phase prior to its reuse.

11. The process of claim 10 wherein the treatment is carried out using an active carbon filter.

12. The process of claim 1 wherein the process is carried out as a continuous process.

* * * * *